United States Patent
Ryu et al.

(10) Patent No.: US 7,669,267 B2
(45) Date of Patent: Mar. 2, 2010

(54) BALL BALANCER CONTROL METHOD OF WASHING MACHINE

(75) Inventors: Doo Young Ryu, Suwon-si (KR); Ja Young Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 301 days.

(21) Appl. No.: 11/907,946

(22) Filed: Oct. 18, 2007

(65) Prior Publication Data

US 2008/0104769 A1 May 8, 2008

(30) Foreign Application Priority Data

Nov. 6, 2006 (KR) .................. 10-2006-0108951

(51) Int. Cl.
*D06F 37/22* (2006.01)
(52) U.S. Cl. .............................. 8/158; 68/24
(58) Field of Classification Search .......... 8/158; 68/24; 74/573.1
See application file for complete search history.

(56) References Cited

U.S. PATENT DOCUMENTS

| | | | | |
|---|---|---|---|---|
| 2,984,094 A | * | 5/1961 | Belaieff ................ | 68/23.2 |
| 4,433,592 A | * | 2/1984 | Tatsumi et al. ............ | 74/570.2 |
| 5,724,862 A | * | 3/1998 | Hannah et al. ............ | 74/570.2 |
| 5,782,110 A | * | 7/1998 | Kim ........................ | 68/23.3 |
| 5,802,885 A | * | 9/1998 | Kim ........................ | 68/23.2 |
| 5,857,360 A | * | 1/1999 | Kim et al. ................ | 68/23.2 |
| 6,550,292 B1 | * | 4/2003 | Southworth et al. ........ | 68/23.2 |

FOREIGN PATENT DOCUMENTS

| | | |
|---|---|---|
| DE | 19718321 C1 | 4/1997 |
| EP | 1096050 A2 | 5/2001 |
| KR | 10-0222947 | 10/1999 |
| SU | 1461796 * | 2/1989 |

OTHER PUBLICATIONS

European Search Report for corresponding European Patent Application No. 07117603.6 dated Jun. 18, 2009, 5 pgs (in English).

* cited by examiner

*Primary Examiner*—Frankie L Stinson
(74) *Attorney, Agent, or Firm*—Staas & Halsey LLP

(57) ABSTRACT

Disclosed is a method of controlling a ball balancer of a washing machine. The method includes variously setting sensing time corresponding to a plurality of water temperature ranges to detect an unbalanced mass, detecting imbalance of laundry and a laundry volume based on a water temperature, which is measured in real time, and the preset sensing time when an optional dehydration mode starts and performing a dehydration process.

13 Claims, 4 Drawing Sheets

BALL BALANCER CONTROL METHOD OF WASHING MACHINE

CROSS-REFERENCE TO RELATED APPLICATIONS

This application claims the benefit of Korean Patent Application No. 2006-108951, filed on Nov. 6, 2006, in the Korean Intellectual Property Office, the disclosure of which is incorporated herein by reference.

BACKGROUND

1. Field

The present invention relates to a ball balancer control method of a washing machine, and more particularly to a ball balancer control method capable of reducing oscillation occurring as oil viscosity in a ball balancer is changed by the temperature of washing water in a dehydration operation.

2. Description of the Related Art

In general, a balancer provided in a drum of a washing machine has a hollow ring shape in which a solid type movable member, such as balls, and oil are provided.

When laundry filled in the drum of the washing machine is eccentrically positioned and rotated in an unbalanced state, balls of the ball balancer move in a predetermined direction, due to differential centrifugal force caused by the unbalanced rotation, in order to compensate for weight deviation of the laundry eccentrically placed in the drum, thereby maintaining the balanced state.

That is, as disclosed in Korean Patent Unexamined Publication No. 1998-69776, the ball balancer has a function of reducing an oscillation of a rotation member, by using damping fluid to which an additive having predetermined viscosity of between 200 cSt and 400 cSt is added so that viscosity variation according to temperature variation is reduced.

However, the oil viscosity may vary depending on the temperature, and the oscillation is affected by the oil viscosity. Thus, the conventional method of using a fixed sensing time does not prevent the oscillation, since the sensing time is fixed when detecting unbalanced mass based on variation of the water temperature.

SUMMARY

Accordingly, it is an aspect of the present invention to solve the above-mentioned problems occurring in the related art, and an aspect of the present invention is to provide a method of detecting imbalance of laundry and laundry volume in various temperature ranges by varying the sensing time when detecting an unbalanced mass according to the measured water temperature.

Additional aspects and/or advantages will be set forth in part in the description which follows and, in part, will be apparent from the description, or may be learned by practice of the invention.

In order to accomplish the above and/or other aspects, there is provided a ball balancer control method of a washing machine, the method comprising variously setting sensing times corresponding to a plurality of water temperature ranges to detect an unbalanced mass, detecting imbalance of laundry and a laundry volume based on a water temperature, which is measured in real time, and the respective set sensing time when an optional dehydration mode starts, and performing a dehydration process.

The foregoing and/or other aspects of the present invention are also achieved by providing a ball balancer control method of a washing machine, the method comprising setting a temperature factor compensating for a difference of sensing data caused by viscosity of the ball balancer, which is changed corresponding to water temperature ranges, detecting imbalance of laundry and a laundry volume based on a water temperature, which is measured in real time, and the set temperature factor when an optional dehydration mode starts, and performing a dehydration process.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
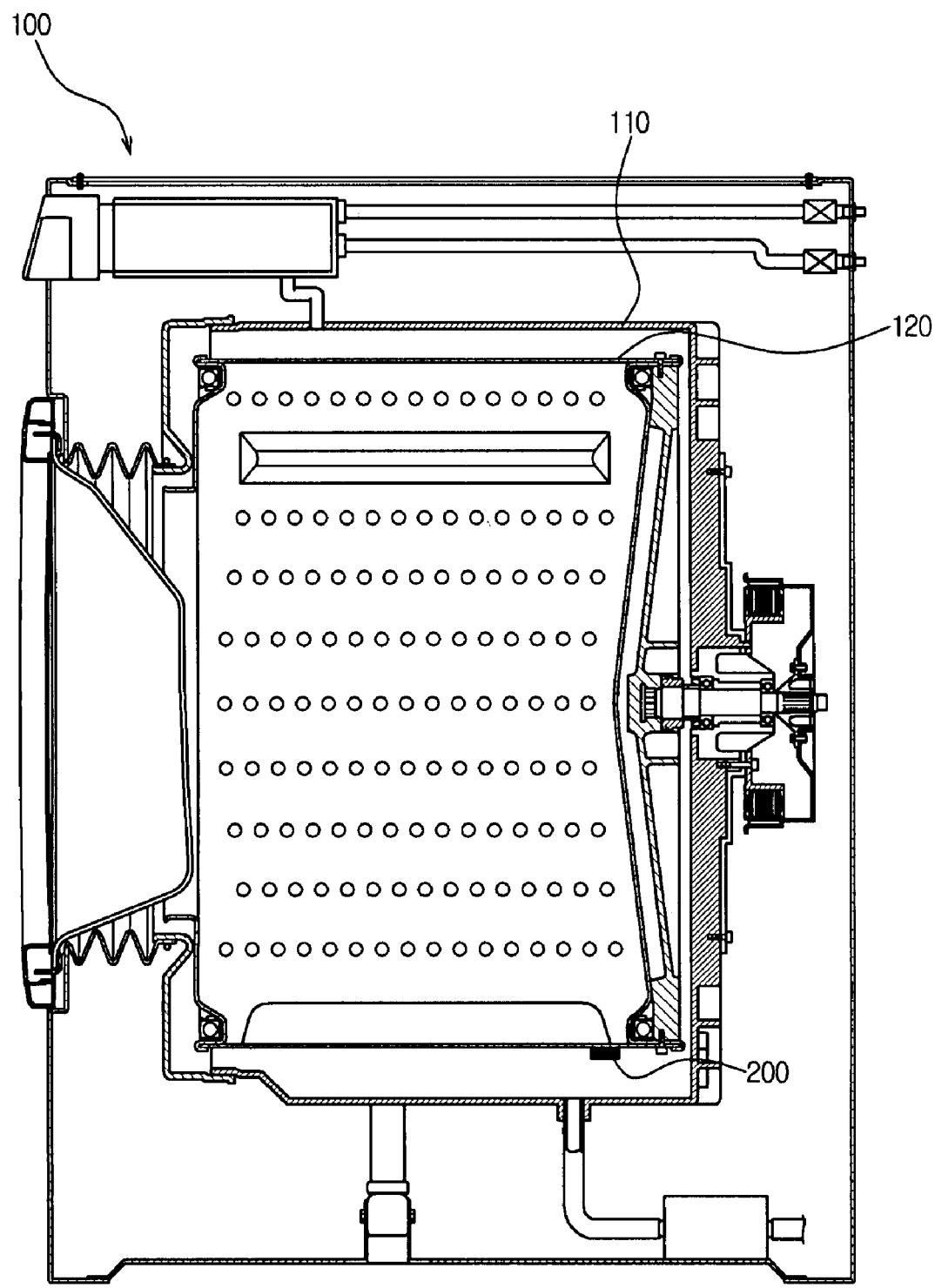
FIG. 1 is a longitudinal sectional view showing the structure of a washing machine adopting a ball balancer according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

FIG. 1 is a longitudinal sectional view showing the structure of a washing machine adopting a ball balancer according to an embodiment of the present invention. As shown in FIG. 1, in order to prevent oscillation and noise from occurring during the dehydration operation caused by laundry eccentrically positioned at a rear part in a drum 120 formed in a tub 110, a washing machine 100 is provided with a ball balancer (not shown). As the drum 120 rotates, a solid type movable member, such as balls, and oil provided in the ball balancer are also rotated. In addition, a temperature sensor 200 sensing the water temperature is installed in the dehydration tub.

Hereinafter, an operational process of the washing machine having the above structure according to an embodiment of the present invention will be explained with reference to the accompanying drawings.

Figure 2:
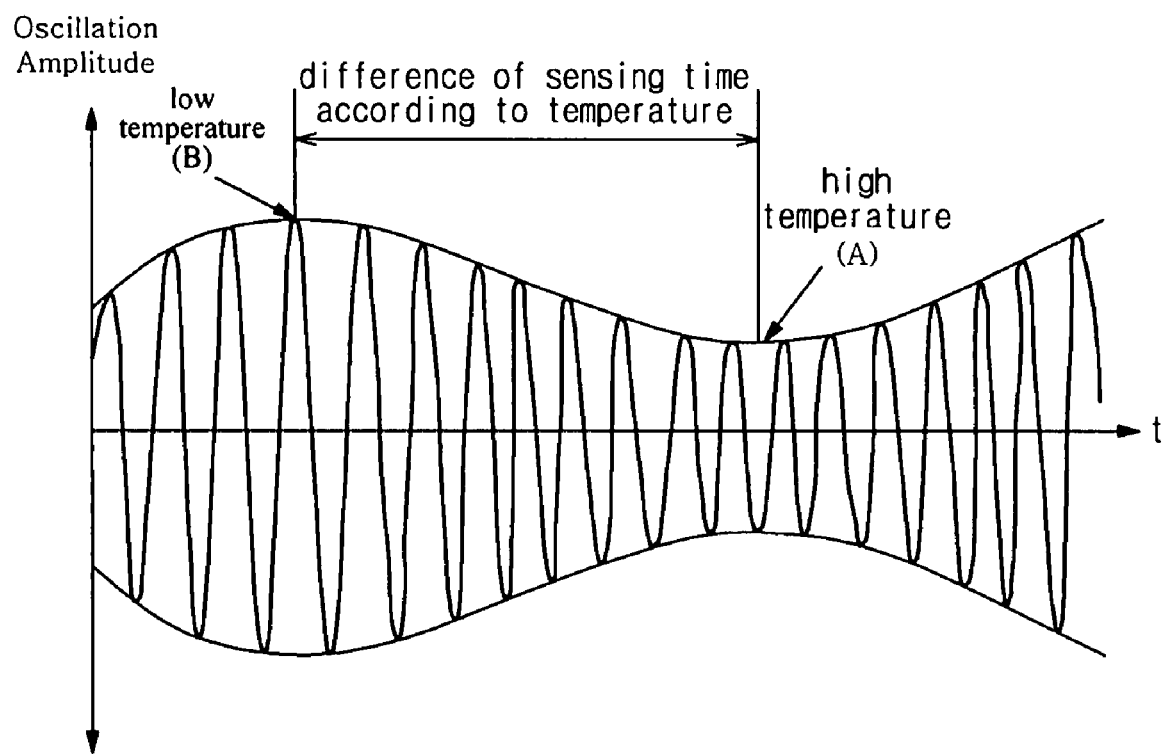
FIG. 2 is a view showing variation of an unbalanced sensing time as a function of viscosity variation caused by temperature variation according to an embodiment of the present invention.

FIG. 2 is a view showing variation of a time required to sense an imbalance (sensing time) as a function of viscosity variation caused by temperature variation according to an embodiment of the present invention. As shown in FIG. 2, in general, oscillation occurs due to a modulation caused by a differential rotation speed between the drum and the ball. At this time, since oil viscosity exerting an influence upon the rotation of balls is variable according to the water temperature, that is, since the oil viscosity may increase as the temperature becomes lowered, a sensing time is lengthened.

For example, in the low temperature (A), the sensing time is lengthened and in the high temperature (B), the sensing time is shortened, so that the washing machine adopting a fixed sensing time cannot precisely sense unbalanced mass and a laundry volume, causing oscillation.

Hereinafter, a control process of reducing the oscillation occurring due to the oil viscosity variation depending on the water temperature will be described.

Figure 3:
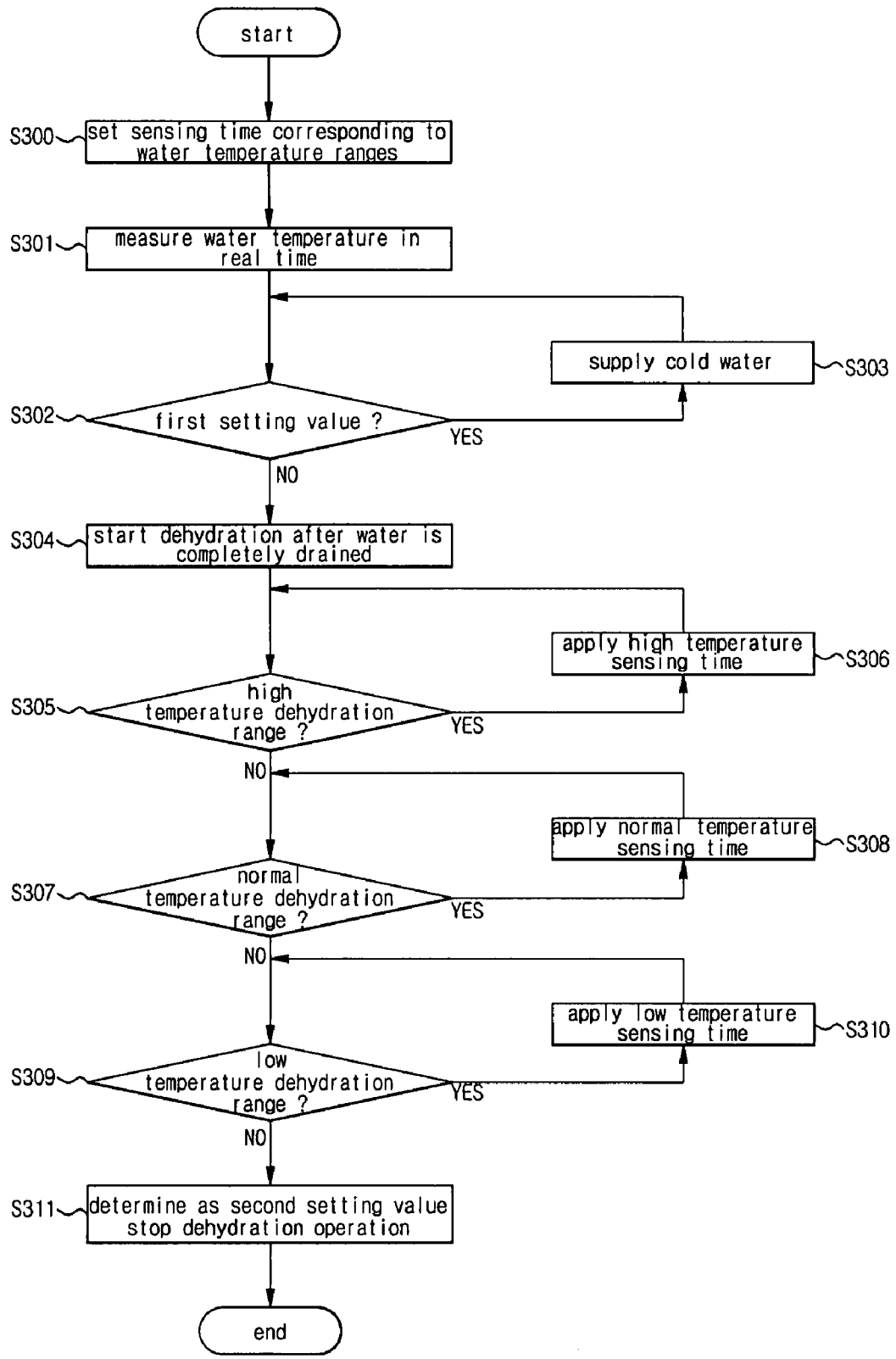
FIG. 3 is a flowchart showing a dehydration process which is performed by sensing imbalance of laundry and a laundry volume in a rinse and dehydration mode according to a first embodiment of the present invention.

FIG. 3 is a flowchart showing a dehydration process, which is performed by sensing an imbalance of laundry and a laundry volume in a rinse and dehydration mode according to a first embodiment of the present invention. As shown in FIG. 3, the water temperature is measured before the dehydration process starts. After that, the dehydration operation is controlled based on the sensing time measured when detecting an unbalanced mass corresponding to a predetermined water temperature range (S300 and S301). At this time, the water temperature range includes a high temperature dehydration range corresponding to a range between 40° C. and 70° C. a normal temperature dehydration range corresponding to a range between 10° C. and 40° C., a low temperature dehydration range corresponding to a range between 0° C. and 10° C. and a non-dehydration range corresponding to a first setting value and a second setting value.

That is, if the measured temperature corresponds to the first setting value, which is 70° C. or above, the dehydration operation is not performed (S302). In this case, cold water is fed so as to lower the temperature to a level below the first setting value, and the water is completely drained (S303 and S304).

After that, if the measured water temperature is less than the first setting value, the water temperature is sequentially compared with the various temperature ranges from the high temperature dehydration range to the low temperature dehydration range so as to determine the temperature range to which the measured water temperature belongs, and the sensing time for the unbalanced mass is applied based on the above result, thereby performing the dehydration operation based on the imbalance of laundry and the laundry volume (S305 to S310).

That is, if the measured water temperature corresponds to the high temperature dehydration range, the sensing time is controlled to be short, and if the measured water temperature corresponds to the low temperature dehydration range, the sensing time is controlled to be long.

After that, when the measured water temperature reaches the second setting value, which is less than 0° C., the dehydration operation is finished (S311).

Figure 4:
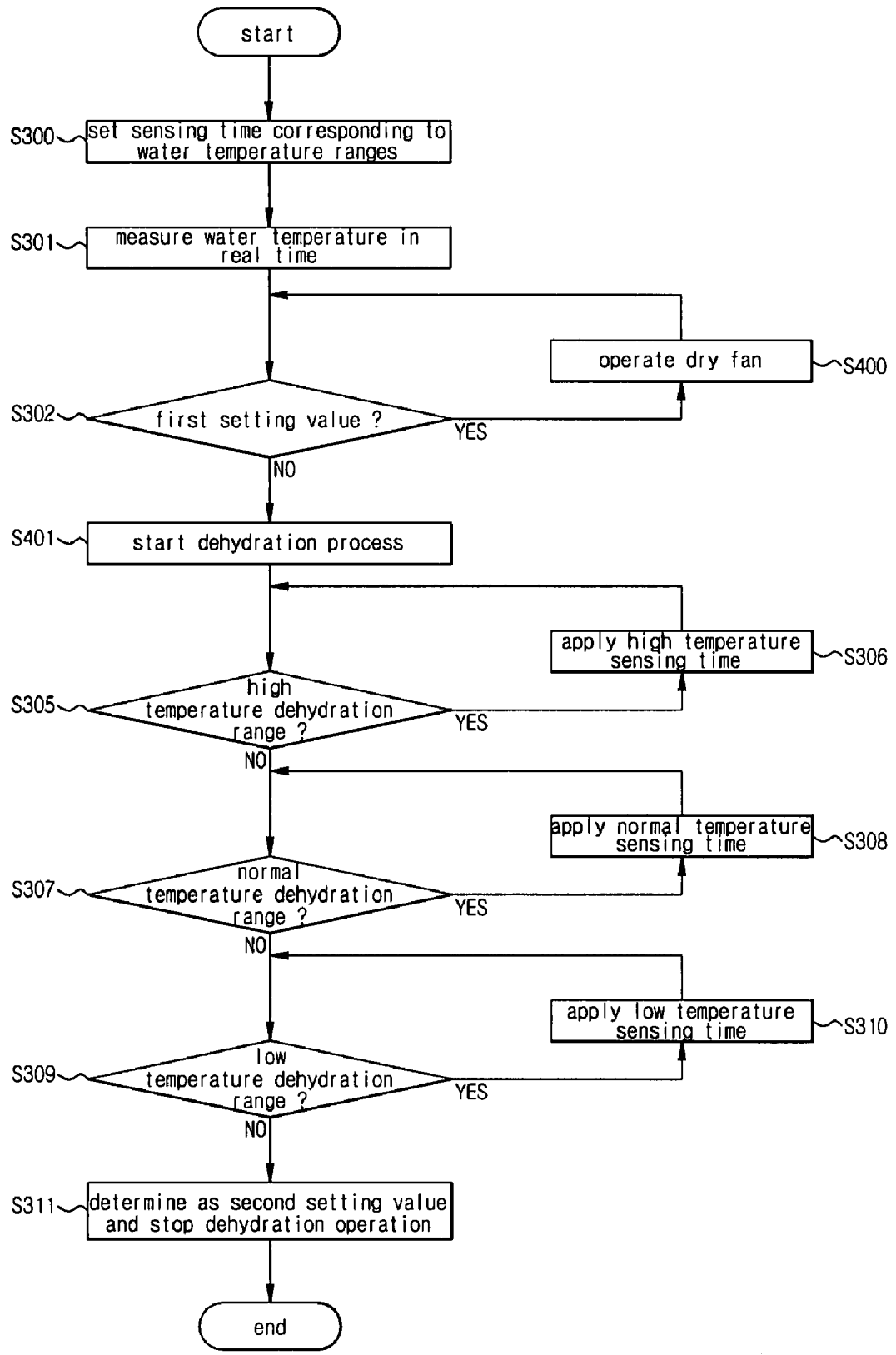
FIG. 4 is a flowchart showing a dehydration process, which is performed by sensing an imbalance of laundry and a laundry volume and single dehydration mode according to a second embodiment of the present invention.

FIG. 4 is a flowchart showing a dehydration process which is performed by sensing an unbalanced mass and a laundry volume in a single dehydration mode according to a second embodiment of the present invention. As shown in FIG. 4, the water temperature is measured before the dehydration process starts. At this time, if the temperature is the first setting value or above, an operation lowering the temperature is performed by operating a dry fan, so as to lower the temperature to a level less than the first setting value (S400) and the dehydration process begins (401).

After that, the dehydration operation is performed in the same manner as the rinse and dehydration operation (S305 to S311).

In addition, different from the first and second embodiments, according to another embodiment of the present invention, a temperature factor compensating for the differential sensing data caused by the viscosity of the ball balancer changed corresponding to the water temperature ranges can be preset. In this case, when sensing imbalance of laundry and a laundry volume based on the water temperature measured in real time during the dehydration mode (a rinse and dehydration mode or a single dehydration mode), the differential sensing data can be compensated by the temperature factor and the dehydration operation can be performed according to the compensation data.

As described above, according to the ball balancer control method of the washing machine of the embodiments of the present invention, the oscillation occurring due to variation of the water temperature can be prevented through varying the sensing time sensing the unbalanced mass by taking the oil viscosity characteristic, which is variable according to the water temperature, into consideration.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of controlling a ball balancer of a washing machine, the method comprising:
   variously setting sensing times corresponding to a plurality of water temperature ranges to detect an unbalanced mass;
   detecting imbalance of laundry and a laundry volume based on a water temperature, which is measured in real time, and the respective set sensing time when an optional dehydration mode starts; and
   performing a dehydration process.

2. The method as set forth in claim 1, wherein if the measured water temperature is within a range between a first setting value and a second setting value, the dehydration process is not performed.

3. The method as set forth in claim 2, wherein the first setting value is 70° C. or above and the second setting value is less than 0° C.

4. The method as set forth in claim 1, wherein the optional dehydration mode includes a rinse and dehydration mode and a single dehydration mode.

5. The method as set forth in claim 2, wherein, in the rinse and dehydration mode, a temperature is measured before the dehydration process starts, and if the temperature is the first setting value or above, cold water is fed so as to lower the temperature to be less than the first setting value and then water is completely drained.

6. The method as set forth in claim 2, wherein, in the single dehydration mode, a temperature is measured before the dehydration process starts, and if the temperature is the first setting value or above, a dry fan is operated so as to lower the temperature to be less than the first setting value.

7. The method as set forth in claim 2, wherein the water temperature ranges include a high temperature dehydration range, a normal temperature dehydration range, a low temperature dehydration range and a non-dehydration range.

8. The method as set forth in claim 7, wherein the high temperature dehydration range is between 40° C. and 70° C.

9. The method as set forth in claim 7, wherein the normal temperature dehydration range is between 10° C. and 40° C.

10. The method as set forth in claim 7, wherein the low temperature dehydration range is between 0° C. and 10° C.

11. The method as set forth in claim 7, wherein the non-dehydration range includes the first setting value and the second setting value.

12. The method as set forth in claim 1, wherein the sensing time is set such that the sensing time is increased as the temperature is lowered.

13. A method of controlling a ball balancer of a washing machine, the method comprising:

setting a temperature factor compensating for a difference of sensing data caused by viscosity of the ball balancer, which is changed corresponding to water temperature ranges;

detecting imbalance of laundry and a laundry volume based on a water temperature, which is measured in real time, and the set temperature factor when an optional dehydration mode starts; and performing a dehydration process.

* * * * *